United States Patent
Inoue et al.

[15] 3,671,454

[45] June 20, 1972

[54] SILICON AND/OR GERMANIUM DIOXIDE SUBSTITUTED MANGANESE ACTIVATED MAGNESIUM ALUMINATE GALLATE PHOSPHOR

[72] Inventors: Taiichi Inoue; Toshimasa Ueda, both of Tokyo, Japan

[73] Assignee: Tokyo Shibaura Electric Co., Ltd., Kawasaki-shi, Japan

[22] Filed: May 5, 1970

[21] Appl. No.: 34,774

[30] Foreign Application Priority Data

May 9, 1969 Japan..................................44/35220
May 16, 1969 Japan..................................44/37346

[52] U.S. Cl. ............................................252/301.4 F
[51] Int. Cl. ....................C09k 1/04, C09k 1/54, C09k 1/68
[58] Field of Search.........................252/301.4 R, 301.4 F

[56] References Cited

UNITED STATES PATENTS 2,363,090  11/1944  Schoenfeldt........................252/301.5
2,457,054  12/1948  Leverenz............................252/301.4 F
3,368,980  2/1968   Avella et al........................252/301.4 R
3,499,843  3/1970   Brown, Jr. et al..................252/301.4 R
3,576,757  4/1971   Brown, Jr...........................252/301.4 R

*Primary Examiner*—Robert D. Edmonds
*Attorney*—Kemon, Palmer & Estabrook

[57] ABSTRACT

A phosphor material emitting a blue-green light which consists of a composition represented by the following general formula: $x\text{MgO}\cdot(1-y-z)\text{Ga}_2\text{O}_3\cdot y\text{Al}_2\text{O}_3\cdot z\text{MO}_2\cdot p\text{MnO}$ where: $\text{MO}_2$ = one kind of oxides selected from the group consisting of $\text{GeO}_2$ and $\text{SiO}_2$ $0.70 \leq x \leq 1.05$
$0.025 \leq y \leq 0.4$
$0 < z \leq 0.3$
$0.001 \leq p \leq 0.05$

7 Claims, 6 Drawing Figures

SILICON AND/OR GERMANIUM DIOXIDE SUBSTITUTED MANGANESE ACTIVATED MAGNESIUM ALUMINATE GALLATE PHOSPHOR

The present invention relates to phosphor materials emitting a blue-green light and more particularly to phosphor materials adapted to be used as a light source for an electronic copying device and a color television Braun tube which consist of magnesium, gallium and aluminum oxides containing either $GeO_2$ or $SiO_2$ as a host material and manganese as an activator.

Phosphor materials consisting of manganese-activated magnesium, gallium and aluminum oxides $[Mg_x \cdot (Ga_{1-y} \cdot Al_y)_2 \cdot O_{3+x+A\&x}/Mn_z$ (where: $0.70 < x < 0.97$; $0.025 < y < 0.4$; $0.002 < z \cdot 0.05)]$ which have heretofore been used in an electronic copying device or color television Braun tube are already disclosed in, for example, the Dutch Pat. Publication No. 6702017. This type of phosphor material is known to have better temperature characteristics and greater resistance to firing depreciation than in the case of a manganese-activated magnesium and gallium oxides phosphor $[(Mg_x \cdot Ga_2O_4/Mn_y)$ (where: $y = 0.001$ to $0.05$, $x+y = 0.75$ to $1.05)$](Refer to the U.S. Pat. No. 3,407,325, British Pat. No. 1,105,233 or West German Pat. No. 1,246,914.). However, the phosphor materials emitting a blue-green light which have heretofore been used in an electronic copying device or a color television Braun tube had the drawbacks that they displayed an insufficient fluorescent efficiency and only generated a low output.

The present invention has been accomplished to eliminate the shortcomings encountered with the prior art phosphor materials and provide a novel type consisting of manganese-activated magnesium and gallium oxides wherein part of the gallium oxide is substituted by aluminum oxide and one kind of the group consisting of germanium dioxide and silicon dioxide. Namely, the present invention relates to phosphor materials giving forth a blue-green light consisting of a composition expressed by a general formula:

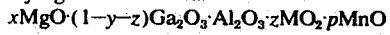

$$xMgO \cdot (1-y-z)Ga_2O_3 \cdot Al_2O_3 \cdot zMO_2 \cdot pMnO$$

where:

$MO_2$ = one kind of oxides selected from the group consisting of $GeO_2$ and $SiO_2$;

$$0.70 \leq x \leq 1.05$$
$$0.025 \leq y \leq 0.4$$
$$0 \leq z \leq 0.3$$
$$0.001 \leq p \leq 0.05,$$

said composition more preferably falling within the following range:

$$0.92 \leq x \leq 0.98$$
$$0.04 \leq y \leq 0.25$$
$$0.10 \leq z \leq 0.20$$
$$0.005 \leq p \leq 0.02$$

The phosphor material of the present invention is prepared from powders of MgO, $Ga_2O_3$, $Al_2O_3$, $GeO_2$ or $SiO_2$ and MnO or other compounds of these metal elements which will produce oxides thereof upon heating to a higher temperature than 800° C. The raw powders are mixed in the aforesaid proportions. The mixture is placed in a heat-resistant vessel made of alumina or silica and subjected to primary firing in an oxidizing atmosphere by heating 10 to 20 hours at a temperature of 1,300° to 1,500° C. After cooling, the fired phosphor material is ground, and thereafter again placed in a heat-resistant vessel to be subjected to secondary firing by heating 1 to 2 hours at a temperature of 1,100° to 1,200° C. in a reducing atmosphere consisting of, for example, 1 percent hydrogen and 99 percent nitrogen.

An object of the present invention is to provide phosphor materials emitting a blue-green light which have a greater fluorescent efficiency than the conventional type consisting of manganese-activated magnesium, gallium and aluminum oxides. Another object of the invention is to provide phosphor materials emitting a blue-green light which are adapted for use particularly in an electronic copying device or color television Braun tube. Still another object of the invention is to provide a method for manufacturing such type of phosphor material giving forth a blue-green light at lower cost.

This invention can be more fully understood from the following detailed description when taken in connection with reference to the accompanying drawings, in which:

FIG. 1 is a curve diagram showing variations in the relative intensity of fluorescent energy with respect to increases in the mol number of gallium oxide substituted by germanium oxide, as associated with a group of phosphor materials of the present invention consisting of manganese-activated magnesium and gallium oxides wherein part of the gallium oxide is substituted by aluminum and germanium oxides;

Figure 6:
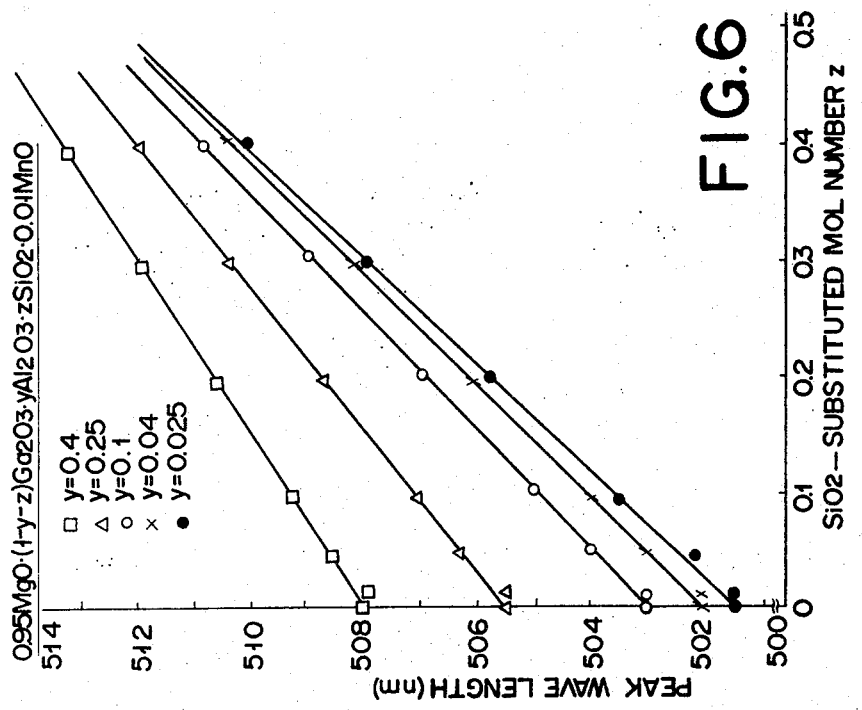
Figure 4:
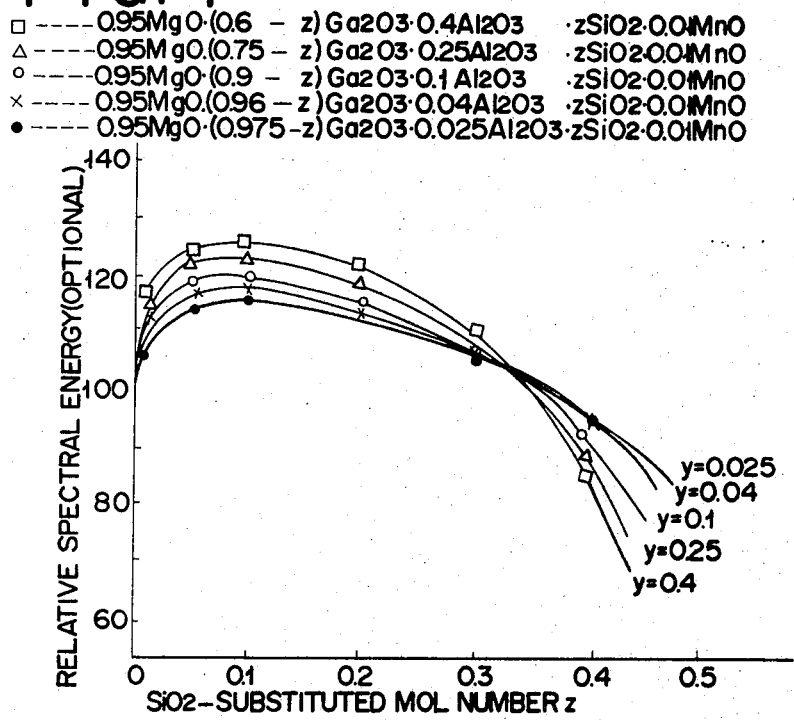
FIG. 4 is a curve diagram showing variations in the relative intensity of fluorescent energy with respect to increases in the mol number of gallium oxide substituted by silicon oxide, as associated with a group of phosphor materials of the invention consisting of manganese-activated magnesium and gallium oxides wherein part of the gallium oxide is substituted by aluminum and silicon oxides.
Figure 5:
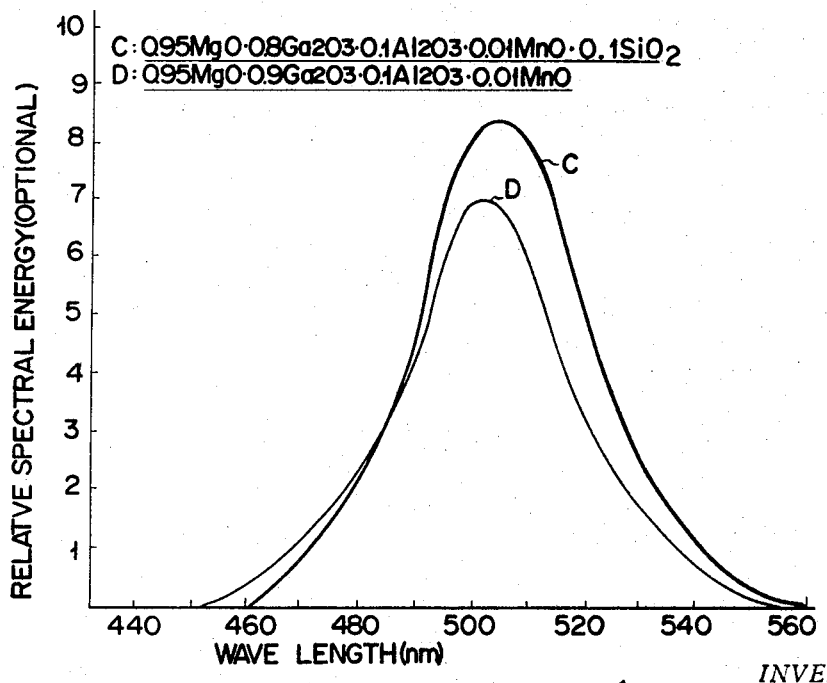

FIG. 5 is a curve diagram comparing the spectral energy distribution of an example of phosphor materials according to the invention shown in FIG. 4 with that of the conventional phosphor materials consisting of manganese-activated magnesium, gallium and aluminum oxides; and FIG. 6 is a curve diagram showning the shift of a peak wave length in the fluorescent spectrum relative to increases in the mol number of gallium oxide substituted by silicon dioxide, as associated with a group of phosphor materials of the invention shown in FIG. 4.

The present invention will be more clearly understood from the disclosure of the examples and the detailed explanation of the drawings which follow.

EXAMPLE 1

There were prepared 35 samples from a composition expressed by a general formula:

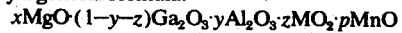

$$xMgO \cdot (1-y-z)Ga_2O_3 \cdot yAl_2O_3 \cdot zMO_2 \cdot pMnO$$

where $Mo_2$ was constituted by $GeO_2$, $x$ was fixed at 0.95, $p$ at 0.01, the mol number $y$ of gallium oxide substituted by $Al_2O_3$ was taken as a parameter and the mol number $z$ of gallium oxide substituted by $GeO_2$ was taken as a variant. However, five samples Nos. 1, 8, 15, 22 and 29 represent the prior art phosphor materials which did not contain $GeO_2$. There are presented in Table 1 below the raw materials of each sample, their proportions and the conditions under which the primary and secondary firings were performed.

Samples Nos. 1 to 35 were prepared from the previously listed proportions of powdered raw materials. Each sample was received in a rectangular polyethylene bag 160 mm × 240 mm and the powdered raw materials were mixed 10 minutes by full shaking. Then the mixture was packed in an uncovered 50 cc quartz crucible, and subjected to primary firing in the air. The optimum firing conditions including temperature and time varied with the value of $z$. Namely, the primary firing was conducted 15 to 20 hours at a temperature of 1,400° to 1,475° C. as shown in Table 1 above. After the primary firing, the fired mass was gently ground in a mortar, and the resultant powders were sieved by a 270-mesh nylon screen. The screened powders were again packed in an uncovered 50 cc quartz crucible and subjected to secondary firing by heating 1 hour at a temperature of 1150° to 1250° C. in a reducing atmosphere consisting of 1 percent hydrogen and 99 percent nitrogen. The mass was cooled to room temperature in the same atmosphere. Thus was prepared each sample of phosphor material. The secondary firing in a reducing atmosphere allowed the manganese (Mn) involved in the com-

TABLE 1

Figure 1:
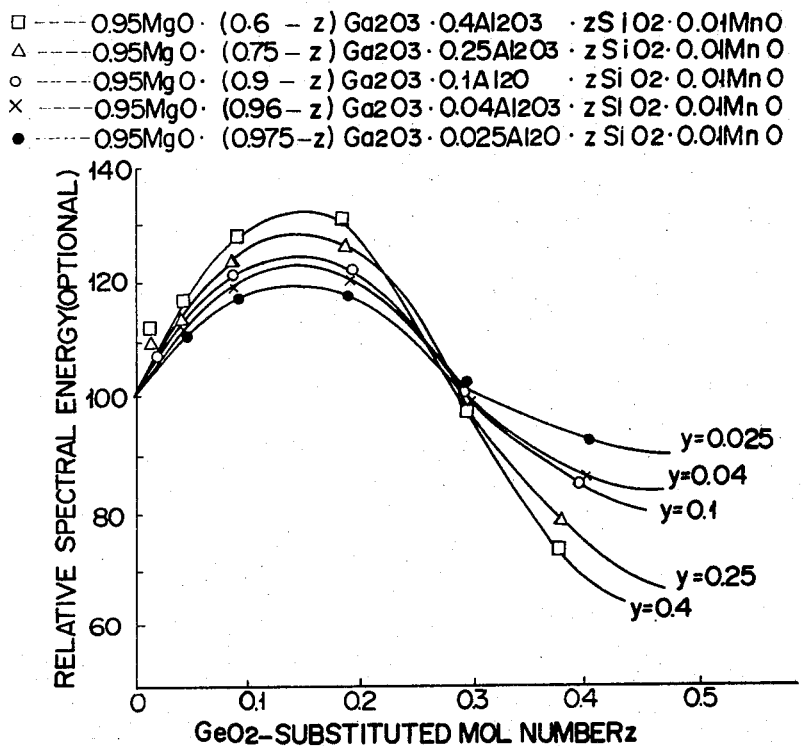
Figure 2:
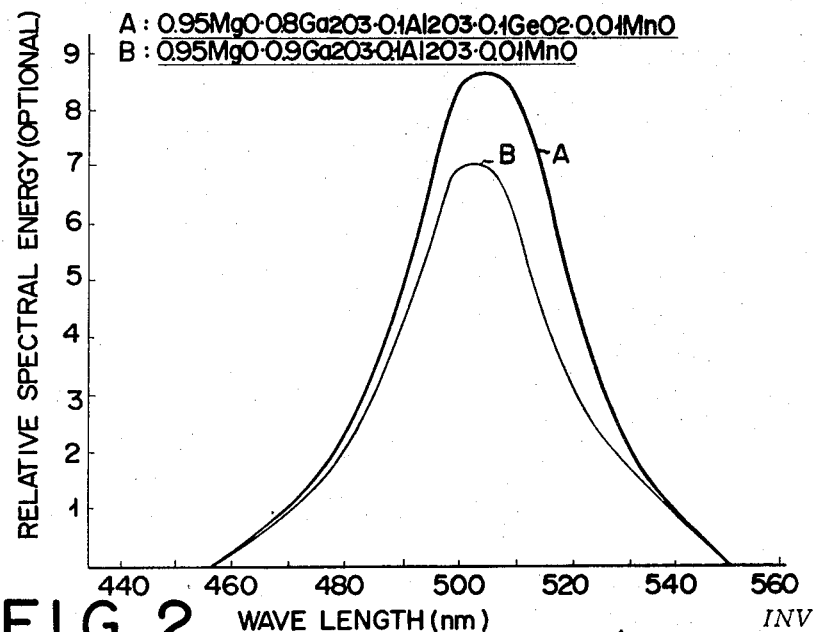
FIG. 2 is a curved diagram comparing the spectral energy distribution of an example of phosphor materials according to the invention shown in FIG. 1 with that of the prior art phosphor materials consisting of manganese-activated magnesium, gallium and aluminum oxides.
Figure 3:
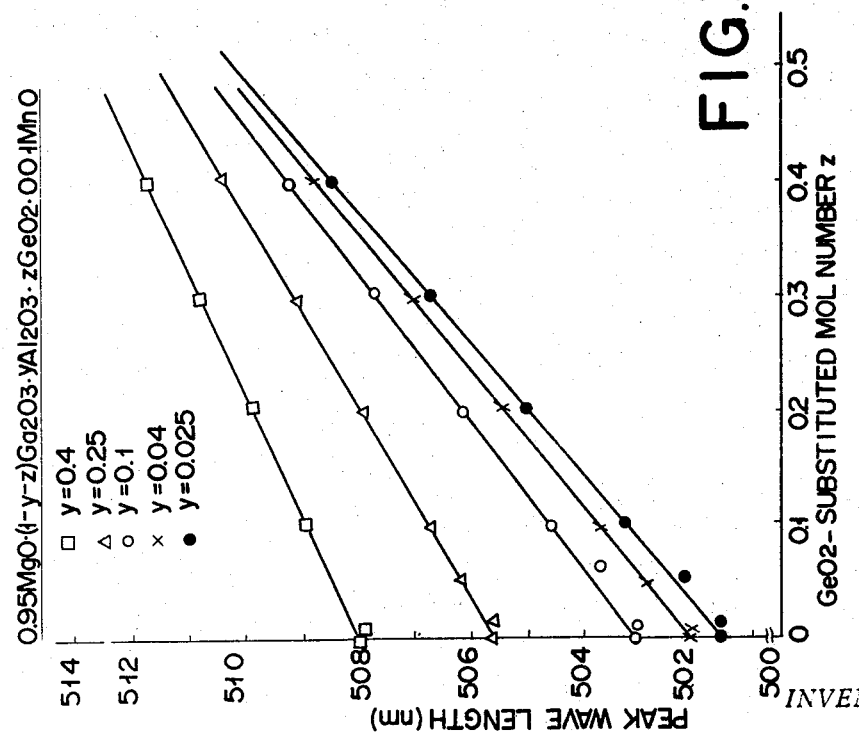
FIG. 3 is a curved diagram showing the shift of a peak wave length in the fluorescent spectrum relative to increases in the mol number of gallium oxide substituted by germanium oxide, as associated with a group of phosphor materials according to the invention shown in FIG. 1.

| Samples | y | z | MgO (g.) | Ga₂O₃ (g.) | Al₂O₃ (g.) | GeO₂ (g.) | MnCO₃ (g.) | Condition of primary firing Temp. (°C.) | Time (h.) | Condition of secondary firing Temp. (°C.) | Time (h.) |
|---|---|---|---|---|---|---|---|---|---|---|---|
| 1  | 0.025 | 0    | 3.830 | 18.275 | 0.255 | 0     | 0.115 | 1,400 | 15   | 1,150 | 1 |
| 2  | 0.025 | 0.01 | 3.830 | 18.088 | 0.255 | 0.105 | 0.115 | 1,425 | 15   | 1,150 | 1 |
| 3  | 0.025 | 0.05 | 3.830 | 17.338 | 0.255 | 0.523 | 0.115 | 1,425 | 17.5 | 1,150 | 1 |
| 4  | 0.025 | 0.1  | 3.830 | 16.401 | 0.255 | 1.046 | 0.115 | 1,425 | 20   | 1,200 | 1 |
| 5  | 0.025 | 0.2  | 3.830 | 14.527 | 0.255 | 2.092 | 0.115 | 1,450 | 17.5 | 1,200 | 1 |
| 6  | 0.025 | 0.3  | 3.830 | 12.652 | 0.255 | 3.138 | 0.115 | 1,475 | 15   | 1,250 | 1 |
| 7  | 0.025 | 0.4  | 3.830 | 10.778 | 0.255 | 4.184 | 0.115 | 1,475 | 17.5 | 1,250 | 1 |
| 8  | 0.04  | 0    | 3.830 | 17.994 | 0.408 | 0     | 0.115 | 1,400 | 15   | 1,150 | 1 |
| 9  | 0.04  | 0.01 | 3.830 | 17.807 | 0.408 | 0.105 | 0.115 | 1,425 | 15   | 1,150 | 1 |
| 10 | 0.04  | 0.05 | 3.830 | 17.057 | 0.408 | 0.523 | 0.115 | 1,425 | 17.5 | 1,150 | 1 |
| 11 | 0.04  | 0.1  | 3.830 | 16.120 | 0.408 | 1.046 | 0.115 | 1,425 | 20   | 1,200 | 1 |
| 12 | 0.04  | 0.2  | 3.830 | 14.245 | 0.408 | 2.092 | 0.115 | 1,450 | 17.5 | 1,200 | 1 |
| 13 | 0.04  | 0.3  | 3.830 | 12.371 | 0.408 | 3.138 | 0.115 | 1,475 | 15   | 1,250 | 1 |
| 14 | 0.04  | 0.4  | 3.830 | 10.497 | 0.408 | 4.184 | 0.115 | 1,475 | 17.5 | 1,250 | 1 |
| 15 | 0.1   | 0    | 3.830 | 16.870 | 1.020 | 0     | 0.115 | 1,400 | 15   | 1,150 | 1 |
| 16 | 0.1   | 0.01 | 3.830 | 16.682 | 1.020 | 0.105 | 0.115 | 1,425 | 15   | 1,150 | 1 |
| 17 | 0.1   | 0.05 | 3.830 | 15.932 | 1.020 | 0.523 | 0.115 | 1,425 | 17.5 | 1,150 | 1 |
| 18 | 0.1   | 0.1  | 3.830 | 14.995 | 1.020 | 1.046 | 0.115 | 1,425 | 20   | 1,200 | 1 |
| 19 | 0.1   | 0.2  | 3.830 | 13.121 | 1.020 | 2.092 | 0.115 | 1,450 | 17.5 | 1,200 | 1 |
| 20 | 0.1   | 0.3  | 3.830 | 11.246 | 1.020 | 3.138 | 0.115 | 1,475 | 15   | 1,250 | 1 |
| 21 | 0.1   | 0.4  | 3.830 | 9.372  | 1.020 | 4.184 | 0.115 | 1,475 | 17.5 | 1,250 | 1 |
| 22 | 0.25  | 0    | 3.830 | 14.058 | 2.549 | 0     | 0.115 | 1,400 | 15   | 1,150 | 1 |
| 23 | 0.25  | 0.01 | 3.830 | 13.871 | 2.549 | 0.105 | 0.115 | 1,425 | 15   | 1,150 | 1 |
| 24 | 0.25  | 0.05 | 3.830 | 13.121 | 2.549 | 0.523 | 0.115 | 1,425 | 17.5 | 1,150 | 1 |
| 25 | 0.25  | 0.1  | 3.830 | 12.184 | 2.549 | 1.046 | 0.115 | 1,425 | 20   | 1,200 | 1 |
| 26 | 0.25  | 0.2  | 3.830 | 10.309 | 2.549 | 2.092 | 0.115 | 1,450 | 17.5 | 1,200 | 1 |
| 27 | 0.25  | 0.3  | 3.830 | 9.435  | 2.549 | 3.138 | 0.115 | 1,475 | 15   | 1,250 | 1 |
| 28 | 0.25  | 0.4  | 3.830 | 6.560  | 2.549 | 4.184 | 0.115 | 1,475 | 17.5 | 1,250 | 1 |
| 29 | 0.4   | 0    | 3.830 | 11.246 | 4.078 | 0     | 0.115 | 1,400 | 15   | 1,150 | 1 |
| 30 | 0.4   | 0.01 | 3.830 | 11.059 | 4.078 | 0.105 | 0.115 | 1,425 | 15   | 1,150 | 1 |
| 31 | 0.4   | 0.05 | 3.830 | 10.309 | 4.078 | 0.523 | 0.115 | 1,425 | 17.5 | 1,150 | 1 |
| 32 | 0.4   | 0.1  | 3.830 | 9.372  | 4.078 | 1.046 | 0.115 | 1,425 | 20   | 1,200 | 1 |
| 33 | 0.4   | 0.2  | 3.830 | 7.498  | 4.078 | 2.092 | 0.115 | 1,450 | 17.5 | 1,200 | 1 |
| 34 | 0.4   | 0.3  | 3.830 | 5.623  | 4.078 | 3.138 | 0.115 | 1,475 | 15   | 1,250 | 1 |
| 35 | 0.4   | 0.4  | 3.830 | 3.749  | 4.078 | 4.184 | 0.115 | 1,475 | 17.5 | 1,250 | 1 | position to retain a divalent state, and in consequence manganese oxide (MnO) to serve as an activator. FIG. 1 shows the relative intensity of fluorescent energy of these samples when they were excited by ultraviolet rays of 2,537 A. The spectral energy of the prior art phosphor material ($z = 0$) is taken as 100 as a variant. Further, determination was made of the spectral energy distribution of each sample when it was excited similarly by ultraviolet rays of 2,537 A. FIG. 2 shows the spectral energy distributions of sample No. 18 ($y = 0.1, z = 0.1$) of the present invention and sample No. 15 ($y = 0.1, z = 0$) representing the prior art phosphor material, which were considered as typical specimens. In FIG. 2, the former sample is indicated by curve A and the latter by curve B. The peak wave lengths of fluorescent light generated by the respective samples are presented in FIG. 3. As apparent from FIG. 1, in the case the mol number z of gallium oxide substituted by germanium dioxide became less than 0.3 as against the value of y, i.e., $0.025 \leq y \leq 0.4$, then the phosphor material of the present invention gave forth a larger fluorescent energy output than the conventional type ($z = 0$). Particularly in case the value of z lay between 0.1 to 0.2, about 20 to 30 percent increase was observed in said fluorescent energy output. FIG. 2 also proves that the phosphor material of the present invention (curve A) wherein part of the gallium oxide was substituted by aluminum and germanium oxides displayed a larger fluorescent energy output than the prior art type (curve B). When the rate z at which gallium oxide was substituted by germanium dioxide was gradually increased, the peak wave length in the fluorescent spectrum shifted toward the long wave side as seen from FIG. 3. Where, however, the mol number z of gallium oxide substituted by germanium dioxide fell to below 0.3, the aforesaid shift of the peak wave length did not exceed about 5.5 nm with respect to the value of y, i.e., $0.025 \leq y \leq 0.4$. This will not present any practical difficulties.

EXAMPLE 2

There were prepared 30 samples Nos. 36 to 65 from a composition expressed by a general formula:

$$xMgO \cdot (1-y-z)Ga_2O_3 \cdot yAl_2O_3 \cdot zMO_2 \cdot pMnO$$

where $MO_2$ was constituted by $SiO_2$, x was fixed at 0.95, p at 0.01, the mol number y of gallium oxide substituted by $Al_2O_3$ was taken as a parameter and the mol number z of gallium oxide substituted by $SiO_2$ was taken as a variant. The raw material of each sample, their proportions and the conditions of the primary and secondary firings are presented in Table 2 below. It will be noted, however, that five samples Nos. 1, 8, 15, 22 and 29 denoting the prior art phosphor materials are also included in Table 2 for convenience of comparison.

TABLE 2

| Samples | y | z | MgO (g.) | Ga₂O₃ (g.) | Al₂O₃ (g.) | SiO₂ (g.) | MnCO₃ (g.) | Condition of primary firing Temp. (°C.) | Time (h.) | Condition of secondary firing Temp. (°C.) | Time (h.) |
|---|---|---|---|---|---|---|---|---|---|---|---|
| 1  | 0.025 | 0    | 3.830 | 18.275 | 0.255 | 0     | 0.115 | 1,400 | 15 | 1,150 | 1 |
| 35 | 0.025 | 0.01 | 3.830 | 18.088 | 0.255 | 0.060 | 0.115 | 1,400 | 15 | 1,150 | 1 |
| 37 | 0.025 | 0.05 | 3.830 | 17.338 | 0.255 | 0.300 | 0.115 | 1,350 | 15 | 1,150 | 1 |
| 38 | 0.025 | 0.1  | 3.830 | 16.401 | 0.255 | 0.601 | 0.115 | 1,200 | 18 | 1,100 | 1 |
| 39 | 0.025 | 0.2  | 3.830 | 14.527 | 0.255 | 1.201 | 0.115 | 1,230 | 18 | 1,100 | 1 |
| 40 | 0.025 | 0.3  | 3.830 | 12.652 | 0.255 | 1.802 | 0.115 | 1,180 | 30 | 1,050 | 1 |
| 41 | 0.025 | 0.4  | 3.830 | 10.778 | 0.255 | 2.402 | 0.115 | 1,150 | 20 | 1,050 | 1 |
| 8  | 0.04  | 0    | 3.830 | 17.994 | 0.408 | 0     | 0.115 | 1,400 | 15 | 1,150 | 1 |
| 42 | 0.04  | 0.01 | 3.830 | 17.807 | 0.408 | 0.060 | 0.215 | 1,400 | 15 | 1,150 | 1 |
| 43 | 0.04  | 0.05 | 3.830 | 17.057 | 0.408 | 0.300 | 0.115 | 1,350 | 15 | 1,150 | 1 |
| 44 | 0.04  | 0.1  | 3.830 | 16.120 | 0.408 | 0.601 | 0.115 | 1,300 | 18 | 1,100 | 1 |
| 45 | 0.04  | 0.2  | 3.830 | 14.245 | 0.408 | 1.201 | 0.115 | 1,230 | 18 | 1,100 | 1 |
| 46 | 0.04  | 0.3  | 3.830 | 12.371 | 0.408 | 1.802 | 0.115 | 1,180 | 20 | 1,050 | 1 |
| 47 | 0.04  | 0.4  | 3.830 | 10.497 | 0.408 | 2.402 | 0.115 | 1,150 | 20 | 1,050 | 1 |
| 15 | 0.1   | 0    | 3.830 | 16.870 | 1.020 | 0     | 0.115 | 1,400 | 15 | 1,150 | 1 |
| 48 | 0.1   | 0.01 | 3.830 | 16.682 | 1.020 | 0.060 | 0.115 | 1,400 | 15 | 1,150 | 1 |
| 49 | 0.1   | 0.05 | 3.830 | 15.932 | 1.020 | 0.300 | 0.115 | 1,350 | 15 | 1,150 | 1 |

TABLE 2—Continued

| Samples | y | z | Raw materials and proportions thereof | | | | | Condition of primary firing | | Condition of secondary firing | |
|---|---|---|---|---|---|---|---|---|---|---|---|
| | | | MgO (g.) | $Ga_2O_3$ (g.) | $Al_2O_3$ (g.) | $SiO_2$ (g.) | $MnCO_3$ (g.) | Temp, (°C.) | Time (h.) | Temp, (°C.) | Time (h.) |
| 50 | 0.1 | 0.1 | 3.830 | 14.995 | 1.020 | 0.601 | 0.115 | 1,300 | 18 | 1,100 | 1 |
| 51 | 0.1 | 0.2 | 3.830 | 13.121 | 1.020 | 1.201 | 0.115 | 1,230 | 18 | 1,100 | 1 |
| 52 | 0.1 | 0.3 | 3.830 | 11.246 | 1.020 | 1.802 | 0.115 | 1,180 | 20 | 1,050 | 1 |
| 53 | 0.1 | 0.4 | 3.830 | 9.372 | 1.020 | 2.402 | 0.115 | 1,150 | 20 | 1,050 | 1 |
| 22 | 0.25 | 0 | 3.830 | 14.058 | 2.549 | 0 | 0.115 | 1,400 | 15 | 1,150 | 1 |
| 54 | 0.25 | 0.01 | 3.830 | 13.871 | 2.549 | 0.060 | 0.115 | 1,400 | 15 | 1,150 | 1 |
| 55 | 0.25 | 0.05 | 3.830 | 13.121 | 2.549 | 0.300 | 0.115 | 1,350 | 15 | 1,150 | 1 |
| 56 | 0.25 | 0.1 | 3.830 | 12.184 | 2.549 | 0.601 | 0.115 | 1,300 | 18 | 1,100 | 1 |
| 57 | 0.25 | 0.2 | 3.830 | 10.309 | 2.549 | 1.201 | 0.115 | 1,230 | 18 | 1,100 | 1 |
| 58 | 0.25 | 0.3 | 3.830 | 9.435 | 2.549 | 1.802 | 0.115 | 1,180 | 20 | 1,050 | 1 |
| 59 | 0.25 | 0.4 | 3.830 | 6.560 | 2.549 | 2.402 | 0.115 | 1,150 | 20 | 1,050 | 1 |
| 29 | 0.4 | 0 | 3.830 | 11.246 | 4.078 | 0 | 0.115 | 1,400 | 15 | 1,150 | 1 |
| 60 | 0.4 | 0.01 | 3.830 | 11.509 | 4.078 | 0.060 | 0.115 | 1,400 | 15 | 1,150 | 1 |
| 61 | 0.4 | 0.05 | 3.830 | 10.309 | 4.078 | 0.300 | 0.115 | 1,350 | 15 | 1,150 | 1 |
| 62 | 0.4 | 0.1 | 3.830 | 9.372 | 4.078 | 0.601 | 0.115 | 1,300 | 18 | 1,100 | 1 |
| 63 | 0.4 | 0.2 | 3.830 | 7.498 | 4.078 | 1.201 | 0.115 | 1,230 | 18 | 1,100 | 1 |
| 64 | 0.4 | 0.3 | 3.830 | 5.623 | 4.078 | 1.802 | 0.115 | 1,180 | 20 | 1,050 | 1 |
| 65 | 0.4 | 0.4 | 3.830 | 3.749 | 4.078 | 2.402 | 0.115 | 1,150 | 20 | 1,050 | 1 |

Samples Nos. 36 to 65 used in Example 2 were prepared substantially in the same manner as in Example 1, excepting that the primary firing was performed 15 to 20 hours at a temperature of 1,150° to 1,400° C. and the secondary firing 1 hour at a temperature of 1,050° to 1,150° C. FIG. 4 indicates the relative intensity of fluorescent energy of the samples listed in Table 2 above when they were excited by ultraviolet rays of 2,537 A. The spectral energy of the prior art phosphor material ($z = 0$) is taken as 100 as a variant. Further, determination was made of the spectral energy distribution of the samples which were excited similarly by ultraviolet rays of 2,537A. FIG. 5 represents the spectral energy distributions of sample No. 50 ($y = 0.1$, $z = 0.1$) of the present invention and sample No. 15 ($y = 0.1$, $z = 0$) representing the prior art phosphor material which were considered as typical specimens. In FIG. 5, the former sample is indicated by curve C and the latter by curve D. Further, there are indicated in FIG. 6 the peak wave lengths of fluorescent energy generated by the respective samples. FIG. 4 proves that where the mol number z of gallium oxide substituted by silicon dioxide stood at less than 0.3 against the value of y, i.e., $0.025 \leq y \leq 0.4$, the phosphor material of the present invention exhibited a larger output than the conventional type ($z = 0$). Particularly when the value of z was maintained between 0.05 and 0.1, the output was elevated approximately 15 to 25 percent. FIG. 5 shows that the phosphor material (curve C) wherein part of the gallium oxide was substituted by aluminum and silicon oxides indicated a larger output than the type (curve D) wherein part of the gallium oxide was substituted by aluminum oxide alone.

When increasing proportions of the gallium oxide were substituted by silicon dioxide, then the peak wave length in the fluorescent spectral energy distribution shifted toward the long wave side. Where, however, the mol number of the substituted gallium oxide amounted to less than 0.3, the shift of the peak wave length did not exceed about 6.5 nm with respect to the value of y, i.e., $0.025 \leq y \leq 0.4$. This will not present any practical difficulties.

The present invention substitutes part of expensive gallium by aluminum and in addition germanium or silicon, offering the advantage of manufacturing phosphor materials emitting a blue-green light at relatively low cost.

The foregoing examples relate to phosphor materials prepared from manganese-activated magnesium and gallium oxides wherein part of the gallium oxide is substituted by aluminum oxide and germanium dioxide or silicon dioxide. It should be understood, however, that the case where the gallium oxide is substituted by both germanium dioxide and silicon dioxide is deemed a modification of the present invention.

What we claim is:

1. A phosphor material emitting a blue-green light consisting of a composition which comprises a host material wherein a part of $Ga_2O_3$ involved in a system of $MgO \cdot Ga_2O_3$ is substituted by $Al_2O_3$ and one kind of the group consisting of $GeO_2$ and $SiO_2$, and Mn serving as an activator, thus being expressed by a general formula:

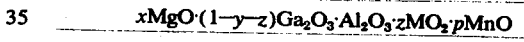

$$xMgO \cdot (1-y-z)Ga_2O_3 \cdot Al_2O_3 \cdot zMO_2 \cdot pMnO$$

where:

$MO_2$ = to oxide selected from the group consisting of $GeO_2$ and $SiO_2$ $$0.70 \leq x \leq 1.05$$
$$0.025 \leq y \leq 0.4$$
$$0.01 \leq z \leq 0.3$$
$$0.001 \leq p \leq 0.05.$$

2. The phosphor material of claim 1 wherein x is between 0.92 and 0.98.

3. The phosphor material of claim 1 wherein y is between 0.04 and 0.25.

4. The phosphor material of claim 1 wherein z is between 0.10 and 0.20.

5. The phosphor material of claim 1 wherein p is between 0.005 and 0.002.

6. The phosphor material of claim 1 wherein:

$$0.92 \leq x \leq 0.98$$
$$0.04 \leq y \leq 0.25$$
$$0.10 \leq z \leq 0.20$$
$$0.005 \leq p \leq 0.02.$$

7. The phosphor material of claim 1 which contains both $GeO_2$ and $SiO_2$.

* * * * *